United States Patent [19]

Trotter et al.

[11] 4,210,570

[45] Jul. 1, 1980

[54] BLENDS OF SUBSTANTIALLY AMORPHOUS OLEFIN COPOLYMERS, COMPATIBLE TACKIFYING RESINS AND PLASTICIZING OILS USEFUL AS HOT MELT, PRESSURE-SENSITIVE ADHESIVES

[75] Inventors: Jimmy R. Trotter; Frederick B. Joyner; Richard L. McConnell, all of Kingsport, Tenn.

[73] Assignee: Eastman Kodak Company, Rochester, N.Y.

[21] Appl. No.: 867,643

[22] Filed: Jan. 6, 1978

[51] Int. Cl.$^2$ ............................................. C08K 5/01
[52] U.S. Cl. ............................................ 260/33.6 AQ
[58] Field of Search ............................... 260/33.6 AQ

[56] References Cited

U.S. PATENT DOCUMENTS

| | | | |
|---|---|---|---|
| 3,691,078 | 9/1972 | Johnston et al. | 260/33.6 AQ X |
| 3,701,760 | 10/1972 | Hagemeyer et al. | 526/73 X |
| 3,954,697 | 5/1976 | McConnell et al. | 526/90 X |

*Primary Examiner*—Sandra M. Person
*Attorney, Agent, or Firm*—Clyde L. Tootle; Daniel B. Reece, III

[57] ABSTRACT

This invention relates to blends of plasticizing oils and compatible tackifiers with substantially amorphous or semicrystalline olefin copolymers containing at least one $C_3$ to $C_5$ linear α-olefin and 15 to 60 mole percent of at least one $C_6$ to $C_{10}$ linear α-olefin which are useful as hot-melt, pressure-sensitive adhesives. The unmodified copolymer base resins have melt viscosities in the range of 5,000 cp up to about 1,000,000 cp at 190° C. The addition of the plasticizing oils and compatible tackifiers to the copolymer base resin causes a dramatic and unexpected increase in the shear adhesion failure time in addition to improved coatability as well as substantial increases in probe tack and peel adhesion values of the copolymers.

16 Claims, No Drawings

BLENDS OF SUBSTANTIALLY AMORPHOUS OLEFIN COPOLYMERS, COMPATIBLE TACKIFYING RESINS AND PLASTICIZING OILS USEFUL AS HOT MELT, PRESSURE-SENSITIVE ADHESIVES

This invention relates to hot melt pressure sensitive adhesive compositions having a novel combination of properties. More specifically, the invention relates to blends of plasticizing oils and compatible tackifiers with substantially amorphous or semicrystalline olefin copolymers containing at least one $C_3$ to $C_5$ linear α-olefin and 15 to 60 mole percent of at least one $C_6$ to $C_{10}$ linear α-olefin which are useful as hot-melt, pressure-sensitive adhesives.

Pressure-sensitive adhesives that have good tack and adhere to numerous substrates are widely used by industry in various applications such as in consumer products. For example, one such application is in the construction of floor tiles having a preapplied adhesive for the do-it-yourself market. In this application the pressure-sensitive adhesive is thinly coated onto the undersurface of floor tiles and covered with a protective release sheet. Installation of the floor tiles is accomplished by removing the release sheet and pressing the tile into place. The pressure-sensitive adhesives presently used in this type application contain either a styrene-butadiene rubber or a styrene-isoprene rubber. Although these pressure-sensitive adhesives provide adequate adhesive properties, they have certain deficiencies that limit their usefulness. These adhesives have poor resistance to plasticizer migration and consequently in applications such as use on floor tiles allow the plasticizer in the tile to migrate into the adhesive thereby causing the adhesive to soften and string excessively. These prior adhesives also have poor heat stability as evidenced by an excessive change in viscosity when exposed to a temperature of 350° F. (the application temperature) for 24 hours. Another disadvantage of these prior adhesives is that they are expensive to produce because of the large amounts of rubber required in the composition to obtain adequate adhesive properties. Therefore, it would be an advance in the state of the art to have a hot-melt pressure-sensitive adhesive that has good adhesive properties without the disadvantages associated with prior pressure-sensitive adhesives.

In accordance with the present invention, blends comprising plasticizing oils and compatible tackifiers with substantially amorphous or semicrystalline olefin copolymers containing at least one $C_3$ to $C_5$ linear α-olefin and 15 to 60 mole percent of at least one $C_6$ to $C_{10}$ linear α-olefin are useful as hot-melt, pressure-sensitive adhesives.

In previous work with certain propylene/1-hexene copolymers containing 40 to 60 mole percent 1-hexene, copolymers having melt viscosities less than 75,000 cp (measured by ASTM D1238) are readily coated by hot-melt techniques on backing materials and provide good pressure-sensitive adhesive properties. However, it was observed that copolymers with melt viscosities greater than 75,000 cp were difficult to coat and the coatings often had striations in them. On the other hand, copolymers containing less than about 40 mole percent 1-hexene are not permanently tacky regardless of melt viscosity level due to the presence of increasing amounts of crystallizable propylene segments in the polymer. When certain combinations of compatible tackifiers with plasticizing oils are added to copolymers having >75,000 cp, it was surprising to find that not only was the melt viscosity of the blend substantially reduced, as expected, but certain pressure-sensitive adhesive properties were substantially improved in an unpredictable manner. For example, the addition of certain combinations of compatible tackifiers and plasticizing oils to substantially amorphous to semicrystalline olefin copolymers derived from at least one monomer selected from propylene, 1-butene or 1-pentene with 15 to 60 mole percent of at least one higher α-olefin of 6 to 10 carbon atoms and having a melt viscosity of >75,000 cp gives adhesives having unexpectedly higher shear adhesion failure time in addition to higher probe tack and peel adhesion values relative to the unmodified copolymers of comparable melt viscosities. The combined addition of the compatible tackifiers and plasticizing oils to such copolymers having melt viscosities of 5,000–75,000 cp at 190° C. substantially improves their coatability on pressure-sensitive backing materials and provides blends with a good balance of hot-melt, pressure-sensitive adhesive properties. In all cases, adhesive blends having permanent tack and a good balance of pressure-sensitive adhesive properties are obtained.

Operable plasticizing oils include paraffinic/naphthenic oils such as Shellflex 371, Tuflo 6204 and Kaydol oils, abietol, low molecular weight oils derived from a $C_5$ hydrocarbon fraction such as Wingtack 10, low molecular weight polyisobutylenes such as Indopol H-100, polymerized DAC-B oils such as Plasticizer H, and liquid polyterpenes such as Piccolyte S-10. Also operable are esters derived from either aromatic or aliphatic acids which have a boiling point of greater than about 275° C. at 760 mm pressure. Useful esters include materials such as tris(2-ethylhexyl) trimellitate, bis(2-ethylhexyl) phthalate, bis(2-ethylhexyl) terephthalate, dibutyl sebacate, bis(2-ethylhexyl) adipate, 2,2,4-trimethyl-1,3-pentanediol diisobutyrate, methyl abietate, and the like. Operable concentrations of these plasticizing oils range from about 1 to about 25 weight percent while the preferred range is about 5 to about 15 weight percent.

The compatible tackifying resins useful in the adhesive compositions of this invention include DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 80° C. to about 135° C.; an acid number of from about 0–2, a saponification value of less than about 1; and an iodine value of from about 30 to 100. Examples of such commercially available resins based on a $C_5$-olefin fraction of this type are "Wingtack" 95 and "Wingtack" 115 tackifying resins sold by Goodyear Tire and Rubber Company. Other operable hydrocarbon tackifiers include the Sta-Tac and Betaprene A or H resins sold by Reichhold Chemical Corporation, Arkon resins sold by Arakawa Forest Chemical Industries, and Escorez resins sold by Exxon Chemical Co.

Also other suitable resins are the terpene polymers such as the polymeric, resinous materials obtained by polymerization and/or copolymerization of terpene hydrocarbons such as the alicyclic, monocyclic, and bicyclic monoterpenes and their mixtures, including alloocimene, carene, isomerized pinene, pinene, dipentene, terpinene, terpinolene, limonene, terpentine, a terpene cut or fraction, and various other terpenes. Particularly useful starting materials are terpene mixtures containing at least 20 percent beta-pinene and/or limonene or dipentene (racemic limonene), and the "sulfate terpentine" obtained as a by-product in the sulfate pulping process. Commercially available resins of the terpene type include the Zonarez terpene B-Series and 7000 Series resins from Arizona Chemical Corp. and Nirez resins from Reichhold Chemical Corp. The typical properties reported for the Zonarez terpene resins include Ring and Ball softening points of about 55° to 125° C. (ASTM E-28-67), color of 2 to 3 (Gardner 1963, 50%, in heptane), acid number of less than 1 (ASTM D465-59), saponification number of less than 1 (ASTM D464-59) and specific gravity at 25° C. of 0.96 to 0.99 (ASTM D1963-61).

The hydrocarbon resins, polyterpenes, or other compatible tackifying resins can be used either alone or in combination. The operable concentration of these tackifiers is about 1 to about 60 weight percent tackifier. The preferred concentration range for these compatible tackifiers is about 10 to about 50 weight percent. Incompatible tackifiers such as those based on wood rosin esters or polyindene are not useful in the practice of this invention since blends containing them are grainy and hazy. Furthermore, the presence of the incompatible tackifiers reduces the tack of the copolymers, often to a very low level.

The base copolymers for the blends of this invention may be made according to the general procedure described in U.S. Pat. No. 3,954,697. Operable melt viscosity limits for these copolymers include 5,000 cp up to about 1,000,000 cp, with the preferred melt viscosity range being 15,000 cp to about 850,000 cp at 190° C. Such copolymers contain 15-60 mole percent higher-1-olefin. Copolymers containing about 40 to 60% higher 1-olefin are essentially amorphous while those containing 15 to about 39% higher 1-olefin are partially crystalline. Generally, the semicrystalline copolymers have heats of fusion of ≦4 calories/gram as measured on samples which have been annealed in an oven at 70° C. for periods of about 2 to 24 hours.

The "apparent heat of fusion" ($\Delta H_f$) of a polymer, as defined here, is the total amount of latent heat in cal./gram involved in the melting of all crystalline phases of a crystallizable polymer. $\Delta H_f$ values are readily obtained using thermal analytical instruments, such as the Perkin-Elmer DSC-2 Differential Scanning Calorimeter or the Du Pont Model 990 Thermal Analyzer with differential scanning calorimeter cell. One method for determining $\Delta H_f$ is described in the *Journal of Applied Polymer Science*, 20, 1209 (1976). Measurement of $\Delta H_f$ is also described in Du Pont Thermal Analysis Bulletin No. 900-8 (1965). Qualitatively, it is possible to compare the degree of crystallinity of polymers by comparing their $\Delta H_f$ values.

Copolymers useful in the practice of this invention are readily prepared using titanium trichloride based catalysts. In general, preferred results have been achieved by using catalyst systems which provide poor stereoregulation in the polymerization of propylene or 1-butene. Combinations of $Et_3Al$ with $AATiCl_3$ with Al/Ti molar ratios ranging from about 1:1 to 5:1 have been found to be quite useful. it is also generally desirable to conduct the polymerization at relatively high temperatures such as from about 110° to about 170° C.

Although not preferred, catalysts which provide highly stereoregular propylene homopolymer may also be used to copolymerize propylene or 1-butene or 1-pentene, with hexene, heptene, octene, nonene, and decene. Examples of highly stereospecific catalysts (for the polymerization of propylene) which may be used include $EtAlCl_2/Bu_3N/TiCl_3$, $EtAlCl_2/HPT/TiCl_3$, and $Et_2AlCl/HPT/TiCl_3$ catalysts ($Bu_3N$=tributylamine; HPT=hexamethylphosphoric triamide), and the polymerizations may be conducted at temperatures as low as about 70° C.

The following test methods are the ones used to evaluate the hot-melt, pressure-sensitive adhesives of this invention.

1. The melt viscosities of the adhesives are determined according to ASTM Procedure D1238 or in a Brookfield Thermosel Viscometer made by Brookfield Engineering Laboratories, Inc.
2. The glass transition temperatures of the adhesives are determined using a differential scanning calorimeter (Perkin-Elmer DSC-2 instrument) operating over the range of −70° C. to +200° C.
3. The Ring and Ball softening points of the tackifying resins are determined according to ASTM Procedure E28.
4. The probe tack values of the coated tapes are determined according to the method as described by Testing Machines, Inc., Amityville, New York, the manufacturer of the Polyken Probe Tack Tester (Model TMI80-2). The probe tack values are determined at 23° C. with the Polyken Probe Tack Tester using a 0.5 cm diameter probe; 100 g/cm² contact pressure, two-second contact time, and 2 cm/second separation speed.
5. The 180° peel adhesion values of the coated tapes are determined according to the Pressure Sensitive Tape Council's PSTC-1 test. The amount of adhesive residue left on the stainless steel testing panels when the bonds are tested is also noted.
6. The shear adhesion failure times of the coated tapes are determined according to the Pressure Sensitive Tape Council's PSTC-7 test.
7. The bleed-through (staining) resistance of the adhesives is determined by coating the adhesives from the melt (190° C.) 0.001 to 0.002 inches thick on 60 pound Kromekote paper with a heated doctor blade. The coated paper tapes are then aged at 70° C. in a forced draft oven, and the degree of bleed-through on the paper backing is visually observed periodically up to four weeks.
8. The thermal stabilities of the adhesives are determined by heating the adhesives to 177° C. in the presence of air for 24 hours in a Brookfield Thermosel viscometer. As a measure of thermal stability, the melt viscosities of the adhesives are determined with the viscometer at 177° C. after 1, 4, 8, 12 and 24 hours and differences from the initial melt viscosity are noted. Char and film formation are also noted.
8. The compatibilities of the various base polymers with the tackifying resins (and plasticizing oils) are determined by melting samples of each blend between glass microscope slides on a Mettler hot stage attachment for a microscope. The temperature of the melt is raised to about 150° C., photomicrographs are made, and phase separation (if any) is noted.

10. Heat of fusion by Differential Scanning Calorimetry.

In order to meet the critical requirements for a wide range of hot-melt, pressure-sensitive adhesive applications, the adhesives of this invention generally have properties which fall within the following ranges:

Glass transition temperature, °C.: 0° to −40°
Probe tack, g: 400 to 1500
Peel adhesion, pound/inch: 1 to 10
Shear adhesion failure time, minutes: >200 to >10,000

The following examples show the unpredicted and surprising advantages obtained when compatible tackifiers and plasticizing oils are used as modifiers according to the teachings of this invention. For example, the addition of compatible tackifiers and plasticizing oils to substantially amorphous or semicrystalline olefin copolymers of at least one α-olefin selected from propylene, 1-butene, and 1-pentene and at least one higher α-olefin of 6 to 10 carbon atoms and having a melt viscosity of about 5,000 to 1,000,000 cp at 190° C. provides adhesives having unexpectedly high shear adhesion failure time in addition to high probe tack and peel adhesion values relative to unmodified copolymers of comparable melt viscosities. It should be noted that the values obtained will depend somewhat on the degree of homogenization of the blend as well as on the thickness and smoothness of the polymer coating. Thus, the pressure-sensitive properties of the blends of this invention may vary by as much as 10–25% depending on the blend method and on the quality of the coating.

The pressure-sensitive adhesive compositions of this invention are prepared by blending together the compatible tackifiers and plasticizing oils with the copolymers in the melt at a temperature of about 160° C. to about 200° C. until a homogeneous blend is obtained. Various methods of blending materials of this type are known to the art and any method that produces a homogeneous blend is satisfactory. These components blend easily in the melt and a heated vessel equipped with a stirrer is all that is required. For example, simple melt tanks with anchor stirrers, Cowles Dissolvers, twin-screw extrusion equipment, Brabender Plastographs, and the like provides an effective mixing means for preparing these hot-melt pressure-sensitive adhesive compositions.

In addition to the polyolefin, tackifier and plasticizing oil, it is desirable for the hot-melt pressure-sensitive adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethylbenzene], "Dalpac" 4C2 [2,6-di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)]. A particularly effective antioxidant is Irganox 1010 which is identified as pentaerythritol tetrakis[3-(3,5-di-tert-butyl-4-hydroxyphenyl)propionate].

There are numerous uses for the pressure-sensitive adhesives of the present invention. One such use is in the construction of women's sanitary napkins. A strip of the pressure-sensitive adhesive may be applied to the polyethylene shield of the napkin and then protected by a release sheet. At the time of use, the release sheet is removed and the napkin is held in place by adhering the pressure-sensitive adhesive to the undergarment, thus eliminating the need for belts and pins. Removal of the napkin is quick as it strips cleanly from the garment.

Another use of the adhesives of this invention is in the construction of floor tiles having a preapplied adhesive for the do-it-yourself market. The pressure-sensitive adhesive is thinly coated onto the undersurface of such floor tiles and covered with a protective release sheet. Quick and permanent installation of the floor tiles is accomplished by removing the release sheet and pressing the tile into place. This technique of installing floor tiles can be extended to other types of coverings such as wall tiles and ceiling tiles. Other major uses for the pressure-sensitive adhesives include their use on tapes and labels.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Poly(56-propylene-co-44-[1-hexene]) [20 g; 100,000 cp at 190° C. by ASTM D1238 using a Tinius Olsen Melt Indexer with an 0.04-inch orifice and 2160 g weight], 16 g of Wingtack 95 tackifying resin (a synthetic polyterpene hydrocarbon type tackifying resin based on a $C_5$ olefin fraction; Ring and Ball softening point=100±5° C., iodine number=30, specific gravity=0.93); 4 g of Shellflex 371 plasticizing oil; and 0.1 g of Irganox 1010 antioxidant (pentaerythritol tetrakis[3-(3,5-ditertbutyl-4-hydroxyphenyl)propionate) are melt blended in a Brabender Plastograph (sigma blade mixer; rotor speed=60 rpm) at 175° C. for 30 minutes under an atmosphere of nitrogen. The clear compatible blend is removed from the mixer and allowed to cool to 23° C. At 23° C., the blend is very tacky to the touch. The melt viscosity of the blend is 23,200 cp at 190° C. when measured with a Brookfield Thermosel Viscometer using spindle SC4-31.

A sample of the blend is placed in a Brookfield Thermosel Viscometer and is maintained at 177° C. for 24 hours in contact with air. The sample does not change in melt viscosity during this period and it does not show any evidence of char formation or film formation on the surface of the melt. A small sample of blend is melted between glass microscope slides in a Mettler hot-stage attachment for a microscope. The melt is clear and compatible.

The blend is coated from the melt (190° C.) 0.001±0.0002 inch thick onto Mylar film (0.001 inch thick) using a heated doctor blade. The resulting pressure-sensitive tapes are transparent and have a probe tack value of 1190 g/0.5 cm diameter probe and a 180° peel adhesion value of 6.1 pounds/inch-width after ageing tapes 24 hours at 23° C. and 50% R.H. No adhesive residue is left when the coated tapes are peeled from the stainless steel test panels. The tapes have shear adhesion failure times of greater than 1,660 minutes when using a 1000 g static load per square inch of bond area. The probe tack and 180° peel adhesion values are not affected when tapes are aged for one week at 50° C.

Coated tapes made using 60 pound Kromekote paper are aged in an oven at 70° C. for four weeks. These aged paper tapes show no evidence of bleed-through. Similarly good results are achieved using Wingtack 115 tackifying resin (Ring and Ball softening point=115°–120° C., molecular weight=1400 to 1500) instead of Wingtack 95.

EXAMPLE 2

The procedure of Example 1 is repeated except that 20 g of poly(80-propylene-co-20-[1-hexene]) having a melt viscosity of 30,000 cp at 190° C. is blended with 16 g of Wingtack 95 and 4 g of Shellflex 371 oil to prepare a blend having a melt viscosity of 4,800 cp at 190° C. Pressure-sensitive tapes made with this blend have a probe tack value of 1030 g/0.5 cm diameter probe, a peel adhesion value of 6.3 pounds/inch, and a shear adhesion failure time of 7100 minutes. Similarly good results are obtained using a poly(80-[1-butene]-co-20-[1-hexene]) instead of the poly(80-propylene-co-20-[1-hexene]).

EXAMPLE 3

The procedure of Example 1 is repeated except that 20 g of poly(68-propylene-co-32-[1-hexene]) having a melt viscosity of 22,500 cp at 190° C. is melt blended with 16 g of Wingtack 95 resin and 4 g of Shellflex 371 oil to provide a blend with a melt viscosity of 4,070 cp at 190° C. (by Brookfield Thermosel method). This blend is compatible and pressure-sensitive tapes made with this blend have a probe tack value of 1060 g/0.5 cm diameter probe, a peel adhesion value of 7.3 pounds/inch, and a shear adhesion failure time of 5120 minutes. Similarly good results are obtained using a poly(70-[1-pentene]-co-30-[1-hexene]) instead of the poly(68-propylene-co-32-[1-hexene]).

EXAMPLE 4

The procedure of Example 1 is repeated except that 20 g of poly(54-propylene-co-46-[1-hexene]) having a melt viscosity of 23,690 cp at 190° C. by (ASTM D1238) is melt blended with 16 g of Wingtack 95 resin and 4 g Shellflex 371 oil to provide a blend with a melt viscosity of 4,170 cp at 190° C. (by Brookfield Thermosel method). This blend is compatible and pressure sensitive tapes made from this blend have a probe tack value of 1280 g/0.5 cm diameter probe, peel adhesion value of 7.3 pounds/inch, and a shear adhesion failure time of 19 minutes.

EXAMPLE 5

The procedure of Example 1 is repeated except that 20 g of a poly(78-propylene-co-22-[1-hexene]) having a melt viscosity of 135,000 cp at 190° C. (by ASTM D1238) is blended with 16 g of Wingtack 95 resin and 4 g Shellflex 371 oil to provide a blend having a melt viscosity of 24,200 cp at 190° C. (by Brookfield Thermosel method). Pressure-sensitive tapes made with this blend have a probe tack value of 1050 g/0.5-cm diameter probe, a peel adhesion value of 6.4 pounds/inch, and a shear adhesion failure time of >10,000 minutes.

EXAMPLE 6

The procedure of Example 1 is repeated except that 20 g of poly(71-propylene-co-29-[1-hexene]) having a melt viscosity of 75,000 cp at 190° C. (by ASTM D1238) is blended with 16 g of Wingtack 95 resin and 4 g of Shellflex 371 oil to provide a blend having a melt viscosity of 12,000 cp at 190° C. (by Brookfield Thermosel method). Pressure-sensitive tapes made with this blend have a probe tack value of 1110 g/0.5-cm diameter probe, a peel adhesion value of 6.5 pounds/inch, and a shear adhesion failure time of 8150 minutes.

EXAMPLE 7

The procedure of Example 1 is repeated except that 20 g of poly(69-propylene-co-31-[1-hexene]) having a melt viscosity of 202,000 cp at 190° C. (by ASTM D1238) is blended with 16 g of Wingtack 95 resin and 4 g of Shellflex 371 oil to provide a blend having a melt viscosity of 51,200 cp at 190° C. (by Brookfield Thermosel method). Pressure-sensitive tapes made with this blend have a probe tack value of 990 g/0.5-cm diameter probe, a peel adhesion value of 6.6 pounds/inch, and a shear adhesion failure time of 8150 minutes.

EXAMPLE 8

The procedure of Example 1 is repeated except that 32 g of poly(50-propylene-co-50-[1-hexene]) having a melt viscosity of 240,000 cp at 190° C. (by ASTM D1238) is blended with 4 g of Wingtack 95 and 4 g of Shellflex 371 oil to prepare a blend having a melt viscosity of 74,400 cp at 190° C. (by ASTM D1238 method). Pressure-sensitive tapes made with this blend have a probe tack value of 570 g/0.5-cm diameter probe, a peel adhesion value of 3.0 pounds/inch, and a shear failure time of 2320 minutes.

EXAMPLE 9

The procedure of Example 1 is repeated except that 26 g of poly(50-propylene-co-50-[1-hexene]) having a melt viscosity of 240,000 cp at 190° C. (by ASTM D1238 method) is blended with 6 g of Wingtack 95 and 8 g of Shellflex 371 oil to prepare a blend having a melt viscosity of 24,200 cp at 190° C. (by ASTM D1238 method). Pressure-sensitive tapes made with this blend have a probe tack value of 580 g/0.5-cm diameter probe, a peel adhesion value of 2.2 pounds/inch and a shear adhesion failure time of 4770 minutes.

EXAMPLE 10

The procedure of Example 1 is repeated except that 26 g of poly(50-propylene-co-50-[1-hexene]) having a melt viscosity of 240,000 cp at 190° C. (by ASTM D1238 method) is blended with 10 g of Wingtack 95 and 4 g of Shellflex 371 oil to prepare a blend having a melt viscosity of 31,000 cp at 190° C. (by ASTM D1238 method). Pressure-sensitive tapes made with this blend have a probe tack value of 820 g/0.5-cm diameter probe, a peel adhesion value of 3.0 pounds/inch, and a shear adhesion failure time of 2640 minutes.

EXAMPLE 11

The procedure of Example 1 is repeated except that 20 g of poly(50-propylene-co-50-[1-hexene]) having a melt viscosity of 240,000 cp at 190° C. (by ASTM D1238 method) is blended with 16 g of Wingtack 95 and 4 g of Shellflex 371 oil to prepare a blend having a melt viscosity of 14,400 cp at 190° C. (by ASTM D1238 method). Pressure-sensitive tapes made with this blend have a probe tack value of 960 g/0.5-cm diameter probe, a peel adhesion value of 5.1 pounds/inch, and a shear adhesion failure time of 3800 minutes.

EXAMPLE 12

The procedure of Example 1 is repeated except that 18 g of poly(50-propylene-co-50-[1-hexene]) having a melt viscosity of 240,000 cp at 190° C. (by ASTM D1238 method) is blended with 14 g of Wingtack 95 and 8 g of Shellflex 371 oil to prepare a blend having a melt viscosity of 5880 cp at 190° C. (by ASTM D1238 method). Pressure-sensitive tapes made with this blend have a probe tack value of 790 g/0.5-cm diameter probe, a peel adhesion value of 3.5 pounds/inch, and a shear adhesion failure time of 4560 minutes.

EXAMPLE 13

The procedure of Example 1 is repeated except that 26 g of poly(47-propylene-co-53-[1-hexene]) having a melt viscosity of 19,600 cp at 190° C. (by ASTM D1238 method) is blended with 10 g of Wingtack 95 and 4 g of Shellflex 371 oil to prepare a blend having a melt viscosity of 3770 cp at 190° C. (by ASTM D1238 method). Pressure-sensitive tapes made with this blend have a probe tack value of 910 g/0.5-cm diameter probe, a peel adhesion value of 4.2 pounds/inch, and a shear adhesion failure time of 130 minutes.

EXAMPLE 14

The procedure of Example 1 is repeated except that 26 g of poly(48-propylene-co-52-[1-hexene]) having a melt viscosity of 100,000 cp at 190° C. (by ASTM D1238 method) is blended with 10 g of Wingtack 95 and 4 g of Shellflex 371 oil to prepare a blend having a melt viscosity of 14,830 cp at 190° C. (by ASTM D1238 method). Pressure-sensitive tapes made with this blend have a probe tack value of 970 g/0.5-cm diameter probe, a peel ahesion value of 4.0 pounds/inch, and a shear adhesion failure time of 670 minutes.

EXAMPLE 15

The procedure of Example 1 is repeated except that 26 g of poly(49-propylene-co-51-[1-hexene]) having a melt viscosity of 290,000 cp at 190° C. (by ASTM D12380) is blended with 10 g of Wingtack 95 and 4 g of Shellflex 371 oil to prepare a blend having a melt viscosity of 43,400 cp at 190° C. (by ASTM D1238 method). Pressure-sensitive tapes made with this blend have a probe tack value of 970 g/0.5-cm diameter probe, a peel adhesion value of 3.4 pounds/inch, and a shear adhesion failure time of 3320 minutes.

EXAMPLE 16

The procedure of Example 1 is repeated except that 26 g of poly(54-propylene-co-46-[1-hexene]) having a melt viscosity of 820,000 cp at 190° C. (by ASTM D1238) is blended with 10 g of Wingtack 95 and 4 g of Shellflex 371 oil to prepare a blend having a melt viscosity of 116,000 cp at 190° C. (by ASTM D1238 method). Pressure-sensitive tapes made with this blend have a probe tack value of 970 g/0.5-cm diameter probe, a peel adhesion value of 3.3 pounds/inch, and a shear adhesion failure time of 4600 minutes.

EXAMPLE 17

The procedure of Example 1 is repeated except that 20 g of poly(50-propylene-co-50-[1-hexene]) having a melt viscosity of 300,000 cp at 190° C. (by ASTM D1238 method) is blended with 16 g of Wingtack 95 and 4 g of Eastman Plasticizer H to prepare a blend having a melt viscosity of 11,200 cp at 190° C. (by ASTM D1238 method). Pressure-sensitive tapes made with this blend have a probe tack value of 1300 g/0.5-cm diameter probe, a peel adhesion value of 3.8 pounds/inch, and a shear adhesion failure time of 3050 minutes.

EXAMPLE 18

The procedure of Example 1 is repeated except that 20 g of poly(50-propylene-co-50-[1-hexene]) having a melt viscosity of 300,000 cp at 190° C. (by ASTM D1238 method) is blended with 16 g of Wingtack 95 and 4 g of Kodaflex TOTM plasticizer to prepare a blend having a melt viscosity of 9900 cp at 190° C. (by ASTM D1238 method). Pressure-sensitive tapes made with this blend have a probe tack value of 1130 g/0.5-cm diameter probe a peel adhesion value of 4.6 pounds/inch, and a shear adhesion failure time of 2870 minutes.

EXAMPLE 19

The procedure of Example 1 is repeated except that 20 g of poly(50-propylene-co-50-[1-hexene]) having a melt viscosity of 300,000 cp at 190° C. (by ASTM D1238 method) is blended with 16 g of Wingtack 95 tackifier and 4 g of Wingtack 10 oil to prepare a blend having a melt viscosity of 12,000 cp at 190° C. (by ASTM D1238 method). Pressure-sensitive tapes made with this blend have a probe tack value of 925 g/0.5-cm diameter probe, a peel adhesion value of 5.0 pounds/inch, and a shear adhesion failure time of 5180 minutes.

EXAMPLE 20

The procedure of Example 1 is repeated except that 20 g of poly(50-propylene-co-50-[1-hexene]) having a melt viscosity of 300,000 cp at 190° C. (by ASTM D1238 method) is blended with 16 g of Wingtack 95 and 4 g of Indopol H-100 oil (low molecular weight polyisobutylene) to prepare a blend having a melt viscosity of 12,800 cp at 190° C. (by ASTM D1238 method). Pressure-sensitive tapes made with this blend have a probe tack value of 1190 g/0.5-cm diameter probe, a peel adhesion value of 6.5 pounds/inch, and a shear adhesion failure time of 4910 minutes.

EXAMPLE 21

The procedure of Example 1 is repeated except that 20 g of poly(50-propylene-co-50-[1-hexene]) having a melt viscosity of 30,000 cp at 190° C. (by ASTM D1238 method) is blended with 16 g of Wingtack 95 and 4 g of Myvacet 9–40 liquid acetylated monoglyceride to prepare a blend having a melt viscosity of 9960 cp at 190° C. (by ASTM D1238 method). Pressure-sensitive tapes made with this blend have a probe tack value of 190 g/0.5-cm diameter probe, a peel adhesion value of 0.2 pounds/inch, and a shear adhesion failure time of <100 minutes. Upon standing at 23° C. for about 1 week, the Myvacet 9–40 exudes to the surface of the adhesive layer. This incompatibility probably accounts for the poor pressure-sensitive properties of this blend. Thus, Myvacet monoglyceride is not an operable plasticizing oil for the blends of this invention.

EXAMPLE 22

The procedure of Example 1 is repeated except that 15.4 g of poly(50-propylene-co-50-[1-hexene]) having a melt viscosity of 850,000 cp at 190° C. (by ASTM D1238 method) is blended with 15.4 g of Wingtack 95 and 9.2 g of Shellflex 371 oil to prepare a blend having a melt viscosity of 41,500 cp at 190° C. (by ASTM D1238 method). Pressure-sensitive tapes made with this blend have a probe tack value of 980 g/0.5-cm diameter probe, a peel adhesion value of 4.6 pounds/inch, and a shear adhesion failure time of 71 minutes.

EXAMPLE 23

The procedure of Example 1 is repeated except that 22 g of poly(50-propylene-co-50-[1-hexene]) having a melt viscosity of 850,000 cp at 190° C. (by ASTM D1238 method) is blended with 16 g of Wingtack 95 and 2 g of Shellflex 371 oil to prepare a blend having a melt viscosity of 47,600 cp at 190° C. (by ASTM D1238 method). Pressure-sensitive tapes made with this blend have a probe tack value of 1066 g/0.5-cm diameter probe, a peel adhesion value of 5.8 pounds/inch, and a shear adhesion failure time of 6780 minutes.

EXAMPLE 24

The procedure of Example 1 is repeated except that 20 g of poly(40-propylene-co-60-[1-hexene]) having a melt viscosity of 350,000 cp at 190° C. (by ASTM D1238 method) is blended with 16 g of Wingtack 95 and 4 g of Shellflex 371 oil to prepare a blend having a melt viscosity of 19,700 cp at 190° C. (by ASTM D1238 method). Pressure-sensitive tapes made with this blend have a probe tack value of 1270 g/0.5-cm diameter probe, a peel adhesion value of 5.8 pounds/inch, and a shear adhesion failure time of 1860 minutes.

EXAMPLE 25

The procedure of Example 1 is repeated except that 34 g of poly(55-propylene-co-45-[1-hexene]) having a melt viscosity of 150,000 cp at 190° C. (by ASTM D1238 method) is blended with 2 g of Wingtack 95 and 4 g of Shellflex 371 oil to prepare a blend having a melt viscosity of 48,500 cp at 190° C. (by ASTM D1238 method). Pressure-sensitive tapes made with this blend have a probe tack value of 640 g/0.5-cm diameter probe, a peel adhesion value of 3.9 pounds/inch, and a shear adhesion failure time of 2560 minutes.

EXAMPLE 26

The procedure of Example 1 is repeated except that 20 g of poly(85-propylene-co-15-[1-hexene]) having a melt viscosity of 148,000 cp at 190° C. (by ASTM D1238 method) is blended with 16 g of Wingtack 95 and 4 g of Shellflex 371 oil to prepare a blend having a melt viscosity of 26,300 cp at 190° C. (by Brookfield Thermosel method). Pressure-sensitive tapes made with this blend have a probe tack value of 715 g/0.5-cm diameter probe, a peel adhesion value of 5.1 pounds/inch, and a shear adhesion failure time of >10,000 minutes. A small piece of the base copolymer used in this example is annealed in an oven at 70° C. for 4 hours. This annealed sample is placed in the sample holder of a Perkin-Elmer DSC-2 Differential Scanning Calorimeter, cooled to −70° C., and heated with a heating rate of 20° C. per minute to a maximum temperature of 175° C. The sample has a Tg value of −15° C. and low, broad melting endotherms at 85° C. and 140° C. Based on the area under these two endotherms, the $\Delta H_f$ value for this copolymer is calculated to be about 2.9 calories per gram.

EXAMPLE 27

The procedure of Example 1 is repeated except that 15.2 g of poly(57-propylene-co-28-[1-butene]-co-15-[1-hexene]) having a melt viscosity of 260,800 cp at 190° C. (by ASTM D1238 method) is blended with 24 g of Wingtack 95 and 0.8 g of Shellflex 371 oil to prepare a blend having a melt viscosity of 17,200 C. at 190° C. (by ASTM D1238 method). Pressure-sensitive tapes made with this blend have a probe tack value of 970 g/0.5-cm diameter probe, a peel adhesion value of 5.6 pounds/inch, and a shear adhesion failure time of 2280 minutes.

EXAMPLE 28

The procedure of Example 1 is repeated except that 20 g of poly(40-propylene-co-30-[1-hexene]-co-15-[1-octene]-co-15-[1-decene]) having a melt viscosity of 278,000 cp at 190° C. (by ASTM D1238 method) is blended with 16 g of Eastman Resin H-100 tackifier and 4 g of Shellflex 371 oil to prepare a blend having a melt viscosity of 15,400 cp at 190° C. (by ASTM D1238 method). Pressure-sensitive tapes made with this blend have a probe tack value of 910 g/0.5-cm diameter probe, a peel adhesion value of 5.0 pounds/inch, and a shear adhesion failure time of 3860 minutes. Similarly good results are obtained with Eastman Resin H-115 tackifier or Eastman Resin H-130 tackifier instead of Eastman Resin H-100 tackifier.

EXAMPLE 29

The procedure of Example 1 is repeated except that 20 g of poly(45-propylene-co-10-[1-butene]-co-5-[1-pentene]-co-40-[1-hexene]) having a melt viscosity of 243,100 cp at 190° C. (by ASTM D1238 method) is blended with 16 g of Zonarez 7100 tackifier and 4 g of Shellflex 371 oil to prepare a blend having a melt viscosity of 12,600 cp at 190° C. (by ASTM D1238 method). Pressure-sensitive tapes made with this blend have a probe tack value of 1090 g/0.5-cm diameter probe, a peel adhesion value of 5.4 pounds/inch, and a shear adhesion failure time of 3350 minutes. Similarly good results are obtained using Zonarex 7085 tackifier instead of Zonarez 7100 tackifier.

EXAMPLE 30

The procedure of Example 1 is repeated except that 20 g of poly(50-propylene-co-50-[1-hexene]) having a melt viscosity of 250,000 cp at 190° C. (by ASTM D1238 method) is blended with 16 g of Wingtack 95 tackifier and 4 g of methyl abietate to prepare a blend having a melt viscosity of 12,800 cp at 190° C. (by ASTM D1238 method). Pressure-sensitive tapes made with this blend have a probe tack value of 1010 g/0.5-cm diameter probe, a peel adhesion value of 5.9 pounds/inch, and a shear adhesion failure time of 3540 minutes. Similarly good results are achieved when abietol is used instead of methyl abietate.

EXAMPLE 31

The procedure of Example 1 is repeated except that 20 g of poly(65-propylene-co-35-[1-hexene]) having a melt viscosity of 560,000 cp at 190° C. (by ASTM D1238 method) is blended with 16 g of Wingtack 95 and 4 g of Shellflex 371 oil to prepare a blend having a melt viscosity of 33,600 cp at 190° C. (by ASTM D1238 method). Pressure-sensitive tapes made with this blend have a probe tack value of 1170 g/0.5-cm diameter probe, a peel adhesion value of 6.5 pounds/inch, and a shear adhesion failure time of greater than 10,000 minutes.

EXAMPLE 32

The procedure of Example 1 is repeated except that 20 g of poly(48-propylene-co-52-[1-hexene]) having a melt viscosity of 1,000,000 cp at 190° C. (by ASTM D1238 method) is blended with 16 g of Wingtack 95 and 4 g of Shellflex 371 to prepare a blend having a melt viscosity of 60,200 cp at 190° C. (by ASTM D1238 method). Pressure-sensitive tapes made with this blend have a probe tack value of 920 g/0.5-cm diameter probe, a peel adhesion value of 5.5 pounds/inch, and a shear adhesion failure time of 6200 minutes.

EXAMPLE 33

The procedure of Example 1 is repeated except that 20 g of poly(50-propylene-co-50-[1-hexene]) having a melt viscosity of 250,000 cp at 190° C. (by ASTM D1238 method) is blended with 16 g of Wingtack 95 and 4 g of Kaydol plasticizing oil to prepare a blend having a melt viscosity of 13,800 cp at 190° C. (by ASTM D1238 method). Pressure-sensitive tapes made with this blend have a probe tack value of 990 g/0.5-cm diameter probe, a peel adhesion value of 4.8 pounds/inch, and a shear adhesion failure time of 3660 minutes.

EXAMPLE 34

The procedure of Example 1 is repeated except that 20 g of poly(50-propylene-co-50-[1-hexene]) having a melt viscosity of 250,000 cp at 190° C. (by ASTM D1238 method) is blended with 16 g of Wingtack 95 and 4 g of Tufflo 6204 plasticizing oil to prepare a blend having a melt viscosity of 15,500 cp at 190° C. (by ASTM D1238 method). Pressure-sensitive tapes made with this blend have a probe tack value of 1030 g/0.5-cm diameter probe, a peel adhesion value of 5.3 pounds/inch, and a shear adhesion failure time of 4050 minutes.

EXAMPLE 35

The procedure of Example 1 is repeated except that 20 g of poly(75-propylene-co-25-[1-hexene]) having a melt viscosity of 10,500 cp at 190° C. (by ASTM D1238 method) is blended with 16 g of Wingtack 95 and 4 g of Shellflex 371 oil to prepare a blend having a melt viscosity of 1260 cp at 190° C. (by Brookfield Thermosel method). Pressure-sensitive tapes made with this blend have a probe tack value of 1140 g/0.5-cm diameter probe, a peel adhesion value of 5.7 pounds/inch, and a shear adhesion failure time of 3610 minutes.

EXAMPLE 36

The procedure of Example 1 is repreated except that 18 g of poly(51-propylene-co-49-[1-hexene]) having a melt viscosity of 235,000 cp at 190° C. (by ASTM D1238 method) is blended with 12 g of Wingtack 95 and 10 g of Shellflex 371 oil to prepare a blend having a melt viscosity of 5500 cp at 190° C. (by ASTM D1238 method). Pressure-sensitive tapes made with this blend have a probe tack value of 690 g/0.5-cm diameter probe, a peel adhesion value of 3.6 pounds/inch, and a shear adhesion failure time of 2560 minutes.

EXAMPLE 37

The procedure of Example 1 is repeated except that 20 g of poly(75-propylene-co-25-[1-hexene]) having a melt viscosity of 5000 cp at 190° C. (by ASTM D1238 method) is blended with 16 g. of Wingtack 95, and 4 g. of Shellflex 371 to prepare a blend having a melt viscosity of 1275 cp at 190° C. (by Brookfield Thermosel method). Pressure-sensitive tapes made with this blend have a probe tack value of 960 g./0.5-cm diameter probe and a peel adhesion value of 5.2 pounds/inch.

EXAMPLE 38

The procedure of Example 1 is repeated except that 10 g. of poly(76-propylene-co-24-[1-hexene]) having a melt viscosity of 202,000 cp at 190° C. (by melt index method) is blended with 24 g. of Wingtack 95 and 6 g. of Shellflex 371 to prepare a blend having a melt viscosity of 2750 cp at 190° C. (by Brookfield Thermosel method). Pressure-sensitive tapes made with this blend have a probe tack value of 439 g/0.5-cm diameter probe, a peel adhesion value of 5.6 pounds/inch, and a shear adhesion failure time of 6920 minutes.

Although the invention has been described in considerable detail with particular reference to certain preferred embodiments thereof, variations and modifications can be effected within the spirit and scope of the invention.

We claim:

1. An adhesive composition capable of being used as a hot-melt, pressure-sensitive adhesive comprising a blend of
   (1) about 98 to 25 weight percent of a substantially amorphous or semicrystalline olefin copolymer containing at least one $C_3$ to $C_5$ linear alpha-olefin and 15 to 60 mole percent of at least one higher linear alpha-olefin of 6 to 10 carbon atoms, said copolymer having a melt viscosity of 5,000 to 1,000,000 centipoise at 190° C.,
   (2) 1 to 60 weight percent of at least one compatible tackifying resin, and
   (3) 1 to 25 weight percent plasticizing oil.

2. An adhesive composition according to claim 1 wherein said compatible tackifying resin is at least one hydrocarbon tackifying resin.

3. An adhesive composition capable of being used as a hot-melt, pressure-sensitive adhesive comprising a blend of
   (1) 90 to 30 weight percent of a substantially amorphous or semicrystalline copolymer containing at least one $C_3$ to $C_5$ linear alpha-olefin and 15 to 60 mole percent of at least one higher linear alpha-olefin of 6 to 10 carbon atoms, said copolymer having a melt viscosity of 5,000 to 1,000,000 centipoise at 190° C., and
   (2) 10 to 50 weight percent of at least one compatible tackifying resin selected from the group consisting of hydrocarbon resins, and polyterpene resins, and
   (3) 5 to 15 weight percent plasticizing oil.

4. An adhesive composition according to claim 3 wherein said compatible tackifying resin is at least one polyterpene resin.

5. An adhesive composition according to claim 3 wherein said compatible tackifying resin is at least one hydrocarbon resin.

6. An adhesive composition according to claim 5 wherein said hydrocarbon tackifying resin is DAC-B hydrocarbon resin.

7. An adhesive composition according to claim 5 wherein said hydrocarbon tackifying resin is Wingtack 95 hydrocarbon resin.

8. An adhesive composition according to claim 5 wherein said hydrocarbon tackifying resin is Wingtack 115 hydrocarbon resin.

9. An adhesive composition according to claim 4 wherein said polyterpene tackifying resin is Zonarez 7100 terpene hydrocarbon resin.

10. An adhesive composition according to claim 3 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

11. An adhesive composition according to claim 4 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

12. An adhesive composition according to claim 5 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

13. An adhesive composition according to claim 6 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

14. An adhesive composition according to claim 7 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

15. An adhesive composition according to claim 8 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

16. An adhesive composition according to claim 9 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized hydrocarbon oils, liquid polyterpenes and esters having a boiling point of greater than about 275° C. at 760 mm pressure derived from either aromatic or aliphatic acids.

* * * * *